(12) United States Patent
Nayebi et al.

(10) Patent No.: US 11,595,239 B2
(45) Date of Patent: Feb. 28, 2023

(54) TRANSMITTER COMPLEX- AND REAL-VALUED IN-PHASE AND QUADRATURE MISMATCH PRE-COMPENSATORS

(71) Applicant: Samsung Electronics Co., Ltd., Suwon-si (KR)

(72) Inventors: Elina Nayebi, San Diego, CA (US); Pranav Dayal, San Diego, CA (US); Kee-Bong Song, San Diego, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 17/572,614

(22) Filed: Jan. 10, 2022

(65) Prior Publication Data
US 2022/0131735 A1    Apr. 28, 2022

Related U.S. Application Data

(62) Division of application No. 17/070,912, filed on Oct. 14, 2020, now Pat. No. 11,223,509.
(Continued)

(51) Int. Cl.
*H04L 27/36* (2006.01)
*H04L 27/00* (2006.01)
*H04L 27/38* (2006.01)

(52) U.S. Cl.
CPC ........ *H04L 27/364* (2013.01); *H04L 27/0014* (2013.01); *H04L 27/3863* (2013.01); *H04L 2027/0016* (2013.01)

(58) Field of Classification Search
CPC ............. H04L 27/0014; H04L 27/364; H04L 27/3863; H04L 2027/0016; H04B 1/30
See application file for complete search history.

(56) References Cited

U.S. PATENT DOCUMENTS 9,491,029 B2   11/2016  Bitton
9,780,889 B1   10/2017  Margulis et al.
(Continued)

OTHER PUBLICATIONS

Notice of Allowance for U.S. Appl. No. 17/070,912, dated Sep. 1, 2021.
Office Action for U.S. Appl. No. 17/070,912, dated May 11, 2021.

*Primary Examiner* — Siu M Lee
(74) *Attorney, Agent, or Firm* — Renaissance IP Law Group LLP (57) ABSTRACT

An in-phase and quadrature mismatch compensator for a quadrature transmitter includes a delay element, a complex-valued filter and an adder. The delay element receives an input transmit signal and outputs a delayed transmit signal. The complex-valued filter receives the input transmit signal and outputs a selected part of a filtered output transmit signal. The adder adds the delayed transmit signal and the selected part of the filtered output transmit signal and outputs a pre-compensated transmit signal. In one embodiment, the selected part of the filtered output transmit signal includes the real part of the complex-valued output transmit signal. In another embodiment, the selected part of the filtered output transmit signal includes the imaginary part of the complex-valued output transmit signal. Two transmit real-valued compensators are also disclosed that combine the in-phase and quadrature signals before being filtered.

18 Claims, 11 Drawing Sheets

Related U.S. Application Data

(60) Provisional application No. 63/025,976, filed on May 15, 2020.

(56) References Cited

U.S. PATENT DOCUMENTS

| | | |
|---|---|---|
| 10,389,561 B2 | 8/2019 | Erez et al. |
| 2012/0177151 A1 | 7/2012 | Hormis |
| 2012/0288026 A1* | 11/2012 | Wang .................. H04B 1/0475 |
| | | 375/285 |
| 2014/0016690 A1* | 1/2014 | Chang .................. H04L 27/364 |
| | | 375/232 |
| 2014/0254644 A1 | 9/2014 | Gotman et al. |
| 2015/0349900 A1* | 12/2015 | Cheng ................. H04L 27/3863 |
| | | 455/302 |
| 2018/0242269 A1 | 8/2018 | Gou et al. |
| 2019/0107601 A1 | 4/2019 | Gupta et al. |
| 2019/0380101 A1 | 12/2019 | Gou et al. |
| 2020/0099408 A1 | 3/2020 | Nayebi et al. |

* cited by examiner

TRANSMITTER COMPLEX- AND REAL-VALUED IN-PHASE AND QUADRATURE MISMATCH PRE-COMPENSATORS

CROSS-REFERENCE TO RELATED APPLICATION

This U.S. non-provisional patent application is a divisional of U.S. patent application Ser. No. 17/070,912, filed on Oct. 14, 2020, which claims the priority benefit under 35 U.S.C. § 119(e) of U.S. Provisional Patent Application Ser. No. 63/025,976, filed on May 15, 2020, the disclosure of which is incorporated herein by reference in its entirety.

TECHNICAL FIELD

The subject matter disclosed herein relates to quadrature transmitters. More particular, the subject matter disclosed herein relates to an in-phase (I) and a quadrature (Q) mismatch compensator (IQMC) that cancels frequency-dependent IQ mismatch (FD-IQMM) in a TX path of a quadrature transmitter.

BACKGROUND

The imbalance between I and Q branches of a quadrature transmitter may create interference between mirror frequencies after up-conversion. The IQMM caused by non-ideal characteristics of I and Q paths may degrade system performance by reducing the effective signal-to-interference ratio. Hence, compensation of FD-IQMM in a TX path of a quadrature transmitter may be-useful in a wideband system.

SUMMARY

An example embodiment provides a transmit in-phase and quadrature mismatch compensator that may include a TX delay element, a TX complex-valued filter and a TX adder. The TX delay element may be configured to receive an input TX signal and output a delayed TX signal. The TX complex-valued filter may be configured to receive the input TX signal and output a selected part of a complex-valued output TX signal. The TX adder may be configured to add the delayed TX signal and the selected part of the complex-valued output TX signal, and output a pre-compensated TX signal. In one embodiment, the selected part of the complex-valued output TX signal may include one of a real part of the complex-valued output TX signal and an imaginary part of the complex-valued output TX signal. In another embodiment, the selected part of the complex-valued output TX signal may include the real part of the complex-valued output TX signal. In still another embodiment, the selected part of the complex-valued output TX signal may include the imaginary part of the complex-valued output TX signal.

An example embodiment provides a transmit in-phase and quadrature mismatch compensator that may include a TX delay element, a TX multiplier, a TX adder and a first real-valued filter. The TX delay element may be configured to receive a first input TX signal and output a delayed TX signal. The TX multiplier may be configured to multiply the first input TX signal by a first cross-multiplication factor and output a first multiplied signal. The TX adder may be configured to add a second input TX signal and the first multiplied signal and output a first summed signal. The first real-valued filter may be configured to receive the first summed signal and output a filtered TX signal. In one embodiment, the first cross-multiplication factor may be a real-valued scalar. In another embodiment, the first input TX signal may be an I TX signal, and the second input TX signal may be a Q TX signal. In still another embodiment, the first input TX signal may be a Q TX signal, and the second input TX signal may be an I TX signal.

An example embodiment provides a transmit in-phase and quadrature mismatch compensator that may include a first delay element, a second delay element, a first real-valued filter, a second real-valued filter and an adder. The first delay element may be configured to receive a first input TX signal and output a first delayed TX signal. The second delay element may be configured to receive a second input TX signal and output a second delayed TX signal. The first real-valued filter may be configured to receive the first input TX signal and output a first filtered TX signal. The second real-valued filter may be configured to receive the second TX signal and output a second filtered TX signal. The adder may be configured to add the first TX delayed signal to the first filtered TX signal and subtract the second filtered TX signal from the added first TX delayed signal and the first filtered TX signal, and output a pre-compensated TX signal. In one embodiment, the first input TX signal may be an I TX signal, and the second input TX signal may be a Q TX signal. In another embodiment, the first and second real-valued filters may form a complex-valued filter. In one embodiment, at least one of the first and second real-valued filters include at least one finite impulse response filter.

BRIEF DESCRIPTION OF THE DRAWING

In the following section, the aspects of the subject matter disclosed herein will be described with reference to exemplary embodiments illustrated in the figure, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC), an assembly, and so forth.

The subject matter disclosed herein provides a transmit IQMC (TX IQMC) having different TX complex- and real-valued IQMM pre-compensation architectures that may cancel FD-IQMM in the TX path while providing a smaller computational complexity in hardware compared to a traditional TX IQMC architecture.

Figure 1:
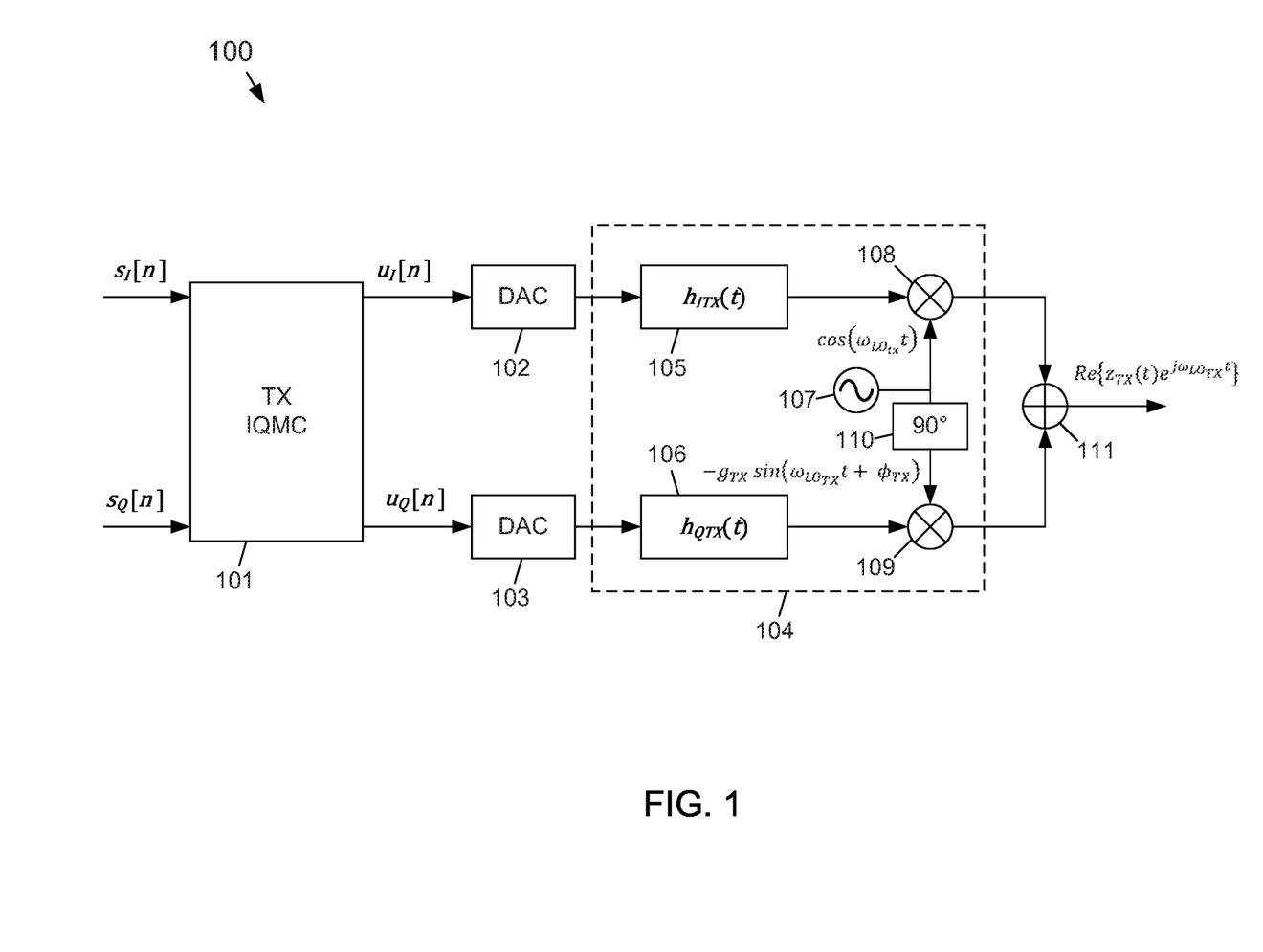
FIG. 1 shows a block diagram of a transmitter path of a generalized quadrature transceiver architecture.

FIG. 1 shows a block diagram of a transmitter path 100 of a generalized quadrature transceiver architecture. The transmitter path 100 may include a TX IQMC 101, digital-to-analog converters (DACs) 102 and 103, and a transmit up-converter 104. The transmit up-converter 104 may include low-pass filters 105 and 106, a local oscillator (TX LO) 107, mixers 108 and 109, and a phase shifter 110. The low-pass filters 105 and 106 may respectively have impulse responses $h_{ITX}(t)$ and $h_{QTX}(t)$ in the in-phase and quadrature paths. The in-phase and quadrature outputs from the transmit up-converter 104 are combined at a combiner 111 for subsequent amplification and/or transmission.

The TX IQMC 101 may receive digitized in-phase $s_I[n]$ and quadrature $s_Q[n]$ signals. The TX IQMC 101 is intended to provide mismatch pre-compensation to the digitized in-phase $s_I[n]$ and quadrature $s_Q[n]$ signals and outputs compensated digitized in-phase $u_I[n]$ and quadrature $u_Q[n]$ signals. The DACs 102 and 103 respectively convert the in-phase $u_I[n]$ and quadrature $u_Q[n]$ signals to analog-domain signals.

Typically, the transmitter path 100 of the generalized transceiver architecture includes TX gain and phase mismatches that may create frequency-independent (FI) mismatch at the transmitter. To denote this, $g_{TX} \neq 1$ and $\phi_{TX} \neq 0$ in FIG. 1 respectively represent the TX gain and phase mismatches at mixers 108 and 109 that may create frequency-independent (FI) mismatch at the transmitter. The mismatch between overall impulse responses $h_{ITX}(t)$ and $h_{QTX}(t)$ on the I and Q paths of the TX may create a frequency-dependent IQ mismatch (FD-IQMM) at the output of the combiner 111, that is, $h_{ITX}(t) \neq h_{QTX}(t)$.

One approach to eliminate the FI and FD mismatches at the transmitter is to pre-compensate the baseband (BB) signal prior to up-conversion. In the frequency domain, the baseband equivalent of the up-converted signal in the TX path (at the output of mixers 108 and 109) may be given by $$Z_{TX}(f) = G_{1TX}(f)U(f) + G_{2TX}(f)U^*(-f), \quad (1)$$

in which $U(f)$ is the frequency response of the baseband signal at the transmitter, and $G_{1TX}(f)$ and $G_{2TX}(f)$ may be defined as $$G_{1TX}(f) = \frac{H_{ITX}(f) + g_{TX}e^{j\phi_{TX}}H_{QTX}(f)}{2}, \quad (2a)$$

$$G_{2TX}(f) = \frac{H_{ITX}(f) - g_{TX}e^{j\phi_{TX}}H_{QTX}(f)}{2}. \quad (2b)$$

$H_{ITX}(f)$ and $H_{QTX}(f)$ in Eqs. (2a) and (2b) respectively are the frequency responses of filters 105 and 106. Without any IQMM ($g_{TX}=1$, $\phi_{TX}=0$, and $h_{ITX}(t)=h_{QTX}(t)$), $G_{2TX}(f)=0$) and, as a result, the second term in Eq. (1) (an image signal) becomes zero.

Effects of TX-IQMM may be eliminated using a pre-compensator in the transmitter path to shape the baseband signal $s[n]=s_I[n]+js_Q[n]$ so that the up-converted signal $z_{TX}(t)$ becomes image-free. The configuration of the IQMM in a transmitter may be different from that in a receiver (RX) because mismatches of the low-pass filters 105 and 106 in the TX path are applied to the signal before the impairment that may be introduced by the TX mixers 108 and 109, while the order is reversed in a RX path. This may result in different real-valued compensator (RVC) architectures for TX and RX paths.

Figure 2:
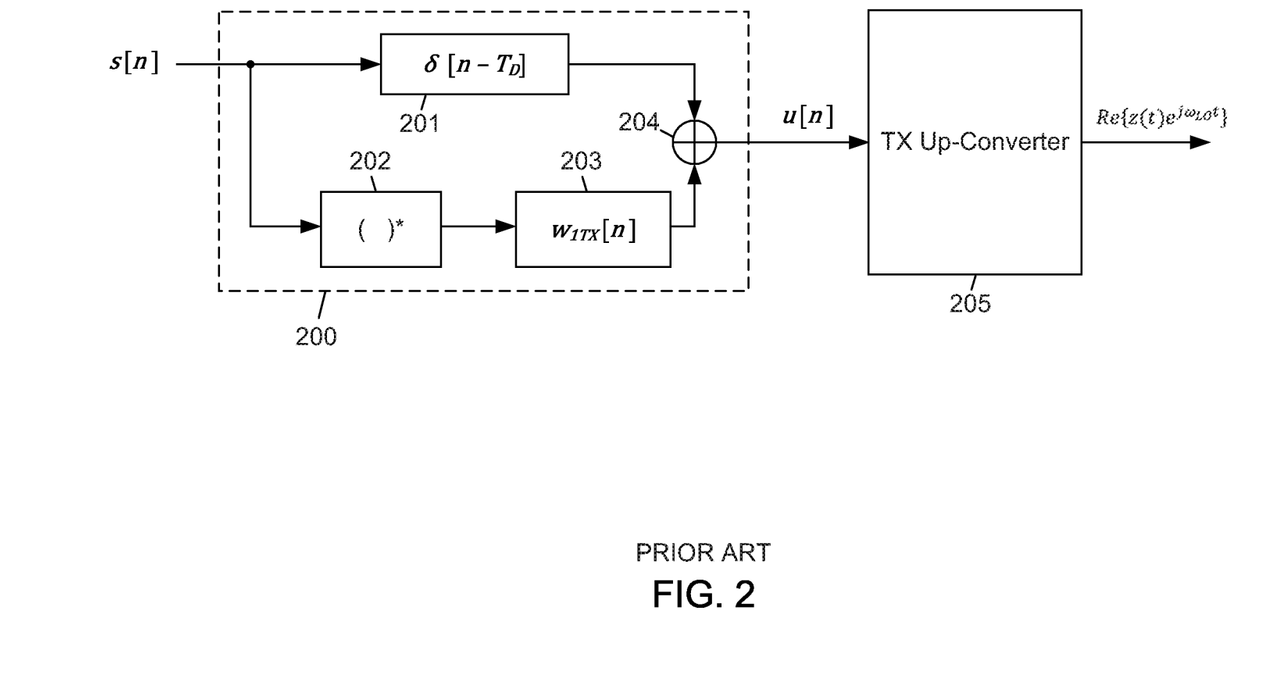
FIG. 2 shows an embodiment of a traditional complex-valued pre-compensator in a TX path.

FIG. 2 shows an embodiment of a traditional complex-valued pre-compensator (CVC) 200 in a TX path. The traditional CVC 200 may include an integer delay element 201 having a delay of $T_D$, a complex-conjugate operator 202, and a complex-valued filter $w_{1TX}[n]$ 203, and a summer (or adder) 204. The CVC 200 may receive a digitized signal $s[n]=s_I[n]+js_Q[n]$ (an in-phase signal $s_I[n]$ and a quadrature signal $s_Q[n]$). The received signal $s[n]$ passes through the delay element 201 in a first path in the CVC 200. In a second path, the received signal $s[n]$ passes through the complex-conjugate operator 202, that takes a complex-conjugate of the input signal $s[n]$, and then through the complex-valued filter 203. The outputs of both paths are summed at the summer 204 and output as a pre-compensated signal $u[n]$. Two DACs (not shown) may convert the pre-compensated signal $u[n]$ to an analog-domain signal $u(t)$. The output $u(t)$ is input to a TX up-converter 205. The output of the TX up-converter 205 is subsequently amplified and/or transmitted. A traditional CVC for a RX path may be the same as the traditional CVC 200 in the TX path.

It may be shown that the traditional CVC of FIG. 2 may cancel the TX IQMM. The following parameter may be defined that depends on the TX gain and filter mismatches as $$V_{TX}(f) \triangleq \frac{H_{ITX}(f)}{g_{TX}H_{QTX}(f)}. \quad (3)$$

For a given delay $T_D$, an optimal traditional CVC filter in FIG. 2 that cancels IQMM may be calculated as $$W_{1TX}^{opt}(f) = -\frac{G_{2TX}(f)}{G_{1TX}(f)}e^{-j2\pi fT_D} = \frac{1 - V_{TX}(f)e^{-j\phi_{TX}}}{1 + V_{TX}(f)e^{-j\phi_{TX}}}e^{-j2\pi fT_D}, \quad (4)$$

in which $W_{1TX}(f)$ is the frequency response of $w_{1TX}[n]$. The output signal after using the optimal pre-compensation response in Eq. (4) becomes $$Z_{TX}(f) = \frac{G_{1TX}(f)G_{1TX}^*(-f) - G_{2TX}(f)G_{2TX}^*(-f)}{G_{1TX}^*(-f)}e^{-j2\pi fT_D}S(f). \quad (5)$$

Figure 3:
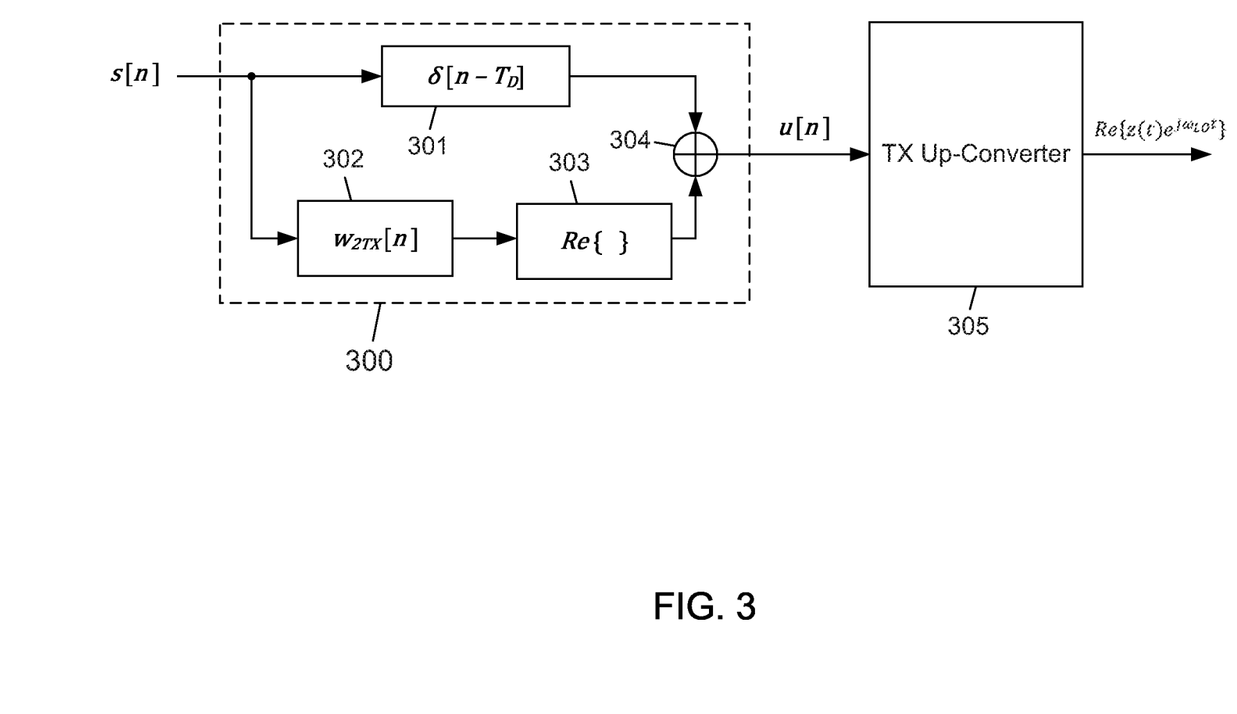
FIG. 3 shows a first example embodiment of a complex-valued pre-compensator in a TX path according to the subject matter disclosed herein.

FIG. 3 shows a first example embodiment of a CVC 300 in a TX path according to the subject matter disclosed herein. The CVC 300 may include a delay element 301 having a delay of $T_D$, a complex-valued filter $w_{2TX}[n]$ 302, a Re{ } operator 303, and a summer (or adder) 304. The CVC 300 may receive a digitized signal $s[n]=s_I[n]+js_Q[n]$ (an in-phase signal $s_I[n]$ and a quadrature signal $s_Q[n]$). The received signal $s[n]$ passes through the delay element 301 in a first path in the CVC 300. In a second path in the CVC 300, the received signal $s[n]$ passes through the complex-valued filter 302, then through the Re{ } operator 303, which only allows the real part of the time-domain signal to pass. The outputs of both paths are summed at the summer 304 and output as a pre-compensated signal $u[n]$. Two DACs (not shown) may convert the signal $u[n]$ to an analog-domain signal $u(t)$. The output $u(t)$ is input to a TX up-converter 305. The output of the TX up-converter 305 is subsequently amplified and/or transmitted.

The CVC 300 may be implemented in hardware using a real filter on the in-phase path and a different real filter on the quadrature path, in which delayed versions of the I and Q signals may also respectively be added to the in-phase and quadrature paths. The CVC 300 in FIG. 3 may achieve the same performance as the CVC 200 in FIG. 2 while having a smaller computational complexity or gate count in the hardware.

For a given delay $T_D$, an optimal CVC 300 in FIG. 3 that cancels IQMM may be calculated as $$W_{2TX}^{opt}(f) = \qquad (6)$$
$$-\frac{2G_{2TX}^*(-f)}{G_{1TX}^*(-f)+G_{2TX}^*(-f)}e^{-j2\pi fT_D} = \left(-1+\frac{e^{-j\phi_{TX}}}{V_{TX}(f)}\right)e^{-j2\pi fT_D},$$

in which $W_{2TX}(f)$ is the frequency response of $w_{2TX}[n]$. A baseband equivalent of the up-converted signal after using the optimal pre-compensation response in Eq. (6), becomes $$z_{TX}[n]=g_{TX}\cos\phi_{TX}h_{QTX}[n]*s[n-T_D]. \qquad (7)$$

Eq. (7) shows that TX IQMM may be canceled using CVC 300.

Figure 4:
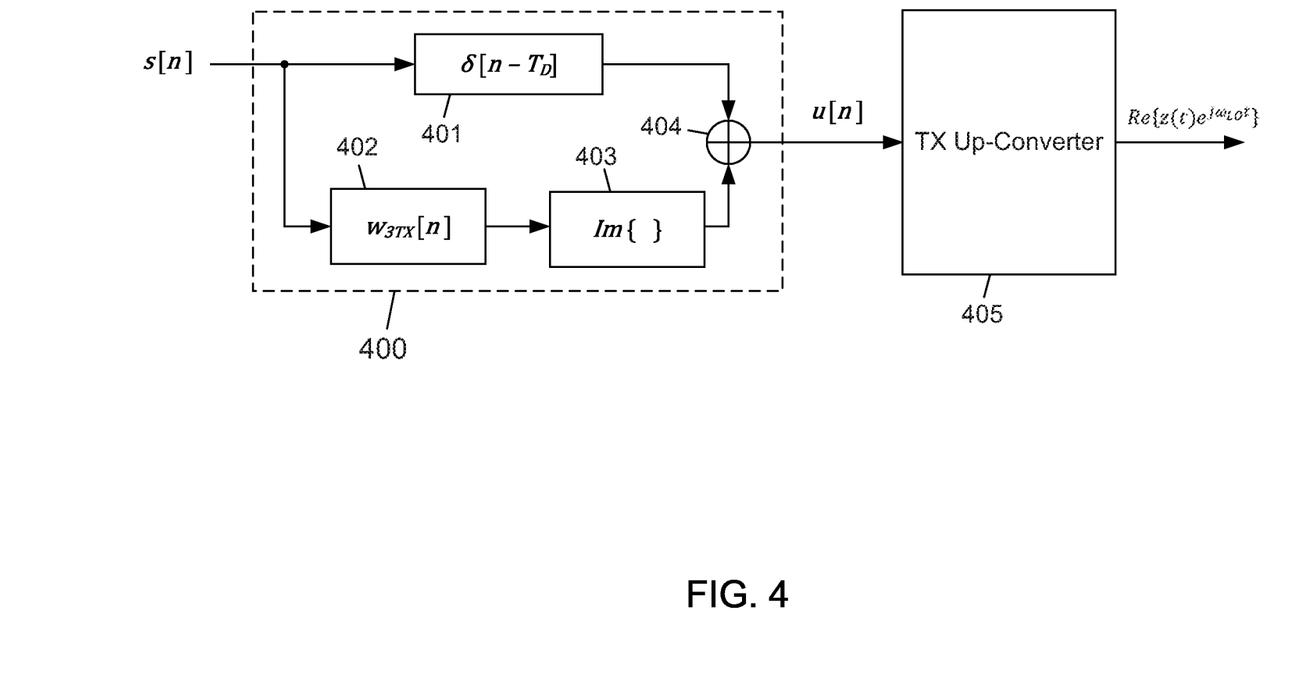
FIG. 4 shows a second example embodiment of a complex-valued pre-compensator in a TX path according to the subject matter disclosed herein.

An imaginary operation in FIG. 3 may alternatively be used after filtering instead of the Re{ } operation 303, which may also cancel TX-IQMM completely. This configuration is shown in FIG. 4, which shows a second example embodiment of a CVC 400 in a TX path according to the subject matter disclosed herein. The CVC 400 may include a delay element 401 having a delay of $T_D$, a complex-valued filter $w_{3TX}[n]$ 402, an Im{ } operator 403, and a summer (or adder) 404. The CVC 400 may receive a digitized signal $s[n]=s_I[n]+js_Q[n]$ (an in-phase signal $s_I[n]$ and a quadrature signal $s_Q[n]$). The received signal $s[n]$ passes through the delay element 401 in a first path in the CVC 400. In a second path in the CVC 400, the received signal $s[n]$ passes through the complex-valued filter 402, then through the Im{ } operator 403, which only allows the imaginary part of the time-domain signal to pass. The outputs of both paths are summed at a summer (or adder) 404 and output as a pre-compensated signal $u[n]$. Two DACs (not shown) may convert the pre-compensated signal $u[n]$ to an analog-domain signal $u(t)$. The analog-domain output $u(t)$ is input to a TX up-converter 405. The output of the TX up-converter 405 is subsequently amplified and/or transmitted.

For a given delay $T_D$, the optimal CVC filter 400 of FIG. 4 that cancels IQMM may be calculated as $$W_{3TX}^{opt}(f) = \qquad (8)$$
$$-\frac{2jG_{2TX}^*(-f)}{G_{1TX}^*(-f)+G_{2TX}^*(-f)}e^{-j2\pi fT_D} = j\left(-1+\frac{e^{-j\phi_{TX}}}{V_{TX}(f)}\right)e^{-j2\pi fT_D}$$

in which $W_{3TX}(f)$ is the frequency response of $w_{3TX}[n]$. A baseband equivalent of the up-converted signal after using the optimal pre-compensation response in Eq. (8), becomes $$z_{TX}[n]=g_{TX}\cos\phi_{TX}h_{QTX}[n]*s[n-T_D]. \qquad (9)$$

Eq. (9) shows that TX IQMM may be canceled using CVC 400. Regardless of whether the Re{ } operation 303 or the Im{ } operation 403 is used, the pre-compensators 300 and 400 are CVC because the filters 302 and 402 are complex valued filters, i.e., $w_{2TX}[n]=Re\{w_{2TX}[n]\}+jIM\{w_{2TX}[n]\}$ and $w_{3TX}[n]=Re\{w_{3TX}[n]\}+jIm\{w_{3TX}[n]\}$, with real-valued filters $Re\{w_{2TX}[n]\}$ and $Re\{w_{3TX}[n]\}$ depicting the real parts of filters $w_{2TX}[n]$ and $w_{3TX}[n]$, respectively, and real-valued filters $Im\{w_{2TX}[n]\}$ and $Im\{w_{3TX}[n]\}$ depicting the imaginary parts of filters $w_{2TX}[n]$ and $w_{3TX}[n]$, respectively.

Figure 5:
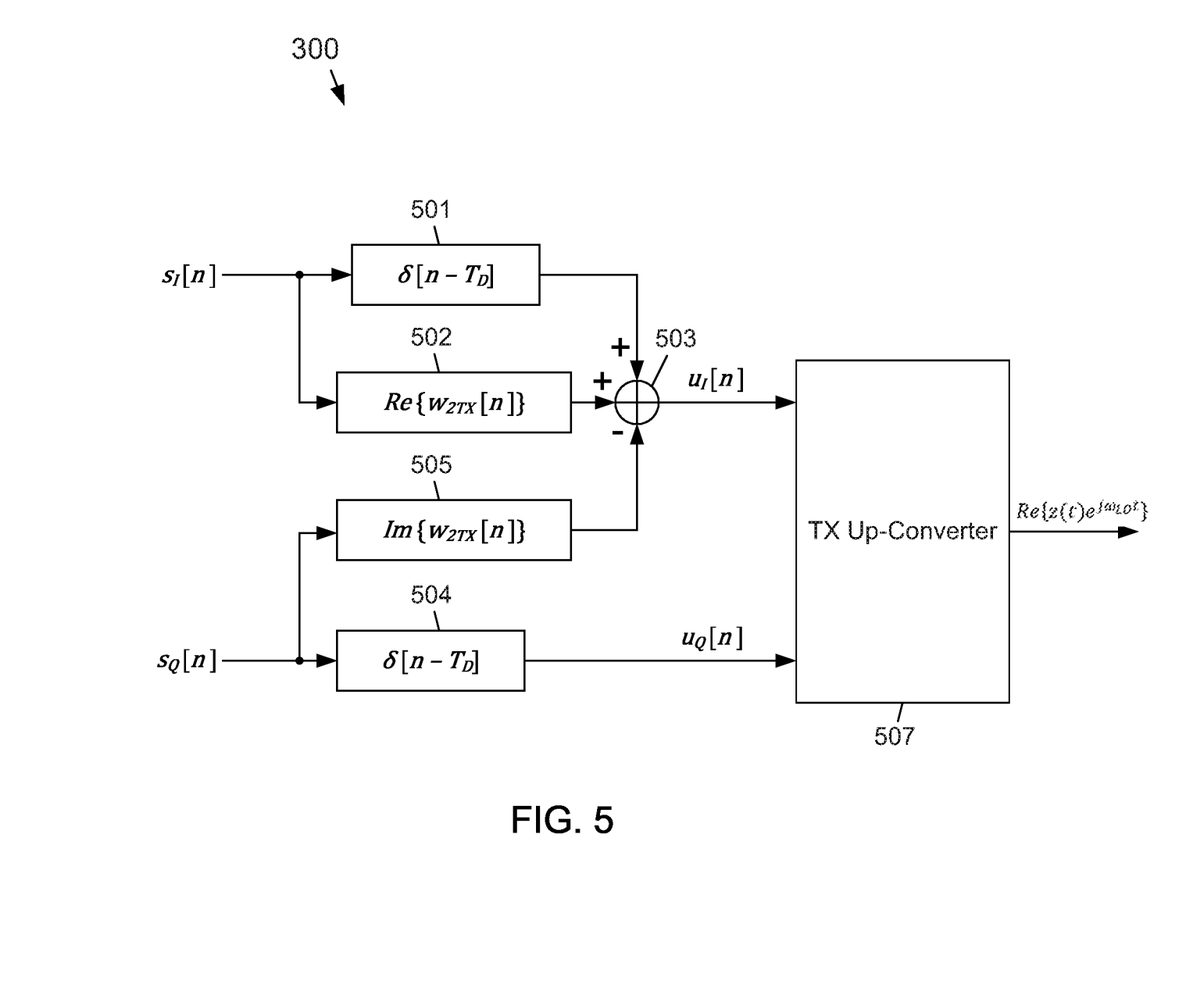
FIG. 5 shows an example of a first embodiment of a hardware implementation for the complex-valued pre-compensator of FIG. 3 according to the subject matter disclosed herein.

FIG. 5 shows an example of a first embodiment of a hardware implementation for the CVC 300 according to the subject matter disclosed herein. The CVC 300 may receive digitized signals $s_I[n]$ and $s_Q[n]$. For the in-phase path, the hardware implementation 500 may include a delay element 501 having a delay of $T_D$, and a real-valued filter $w_{2TX,I}[n]=Re\{w_{2TX}[n]\}$ 502. The received signal $s_I[n]$ passes through the delay element 501 in a first path and then passes through the real-valued filter 502 in a second path that is parallel to the first path.

For the quadrature path, the hardware implementation for the CVC 300 may include a delay element 504 having a delay of $T_D$, and a real-valued filter $w_{2TX,Q}[n]=Im\{w_{2TX}[n]\}$ 505. The received signal $s_Q[n]$ passes through the delay element 504 in a third path and output as a pre-compensated signal $u_Q[n]$. The received signal $s_Q[n]$ also passes through the real-valued filter 505. The outputs from the delay element 501, the real-valued filter 502, and the real-valued filter 505 are summed (with arithmetical signs as shown in FIG. 5) and output as a pre-compensated signal $u_I[n]$. The pre-compensated signals $u_I[n]$ and $u_Q[n]$ are input to a TX up-converter 507 and subsequently amplified and/or transmitted. Real-valued filters $w_{2TX,I}[n]$ and $w_{2TX,Q}[n]$ can be viewed as one complex-valued filter $w_{2TX}[n]=w_{2TX,I}[n]+jw_{2TX,Q}[n]$.

Figure 6:
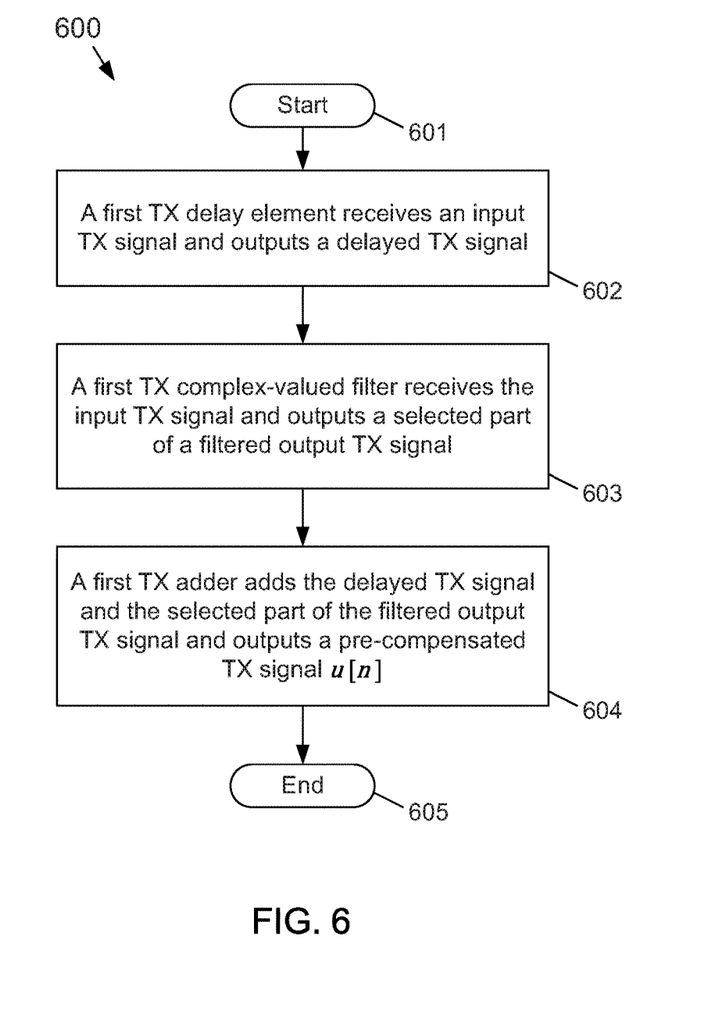
FIG. 6 shows a first example embodiment of a method for pre-compensating IQ mismatch in baseband for transmission in a quadrature transmitter according to the subject matter disclosed herein.

FIG. 6 shows a first example embodiment of a method 600 for pre-compensating IQ mismatch in baseband for transmission in a quadrature transmitter according to the subject matter disclosed herein. Referring to FIGS. 3 and 6, the method 600 starts at 601 in FIG. 6. At 602, a first TX delay element 301 receives an input TX signal and outputs a delayed TX signal. At 603, a first TX complex-valued filter 302 receives the input TX signal and outputs a selected part 303 of a filtered output TX signal. At 604, a first TX adder 304 adds the delayed TX signal and the selected part of the filtered output TX signal and outputs a pre-compensated TX signal $u[n]$. The method ends at 605, and may be continuously repeated as needed.

The CVCs 300, 400 and 500, and the method 600 may be embodied by one or more modules that may use any combination of software, firmware and/or hardware configured to provide the functionality described herein in connection with the CVCs 300, 400 and 500, and the method 600. For example, any software may be embodied as a software package, code and/or instruction set or instructions, and any hardware may include, for example, singly or in any combination, an assembly, hardwired circuitry, programmable circuitry, state machine circuitry, and/or firmware that stores instructions executed by programmable circuitry. The one or more modules may, collectively or individually, be embodied as circuitry that forms part of a larger system, for example, but not limited to, an integrated circuit (IC), system on-chip (SoC), an assembly, and so forth.

The CVCs 300, 400 and 500 provide a reduction in the number of multiplications and additions in comparison to the number of multiplications and additions that are needed for the traditional CVC 200. For example, the CVC 300 applies the complex-valued filter 302 to the input signal and the real-valued or the imaginary-valued part is then used, which may be implemented with smaller number of multiplications and additions as shown in CVC 500, whereas in the traditional CVC 200, a complex conjugate of the input signal is taken, then the complex-valued filter 203 is applied to the complex conjugate of the input signal.

Figure 7:
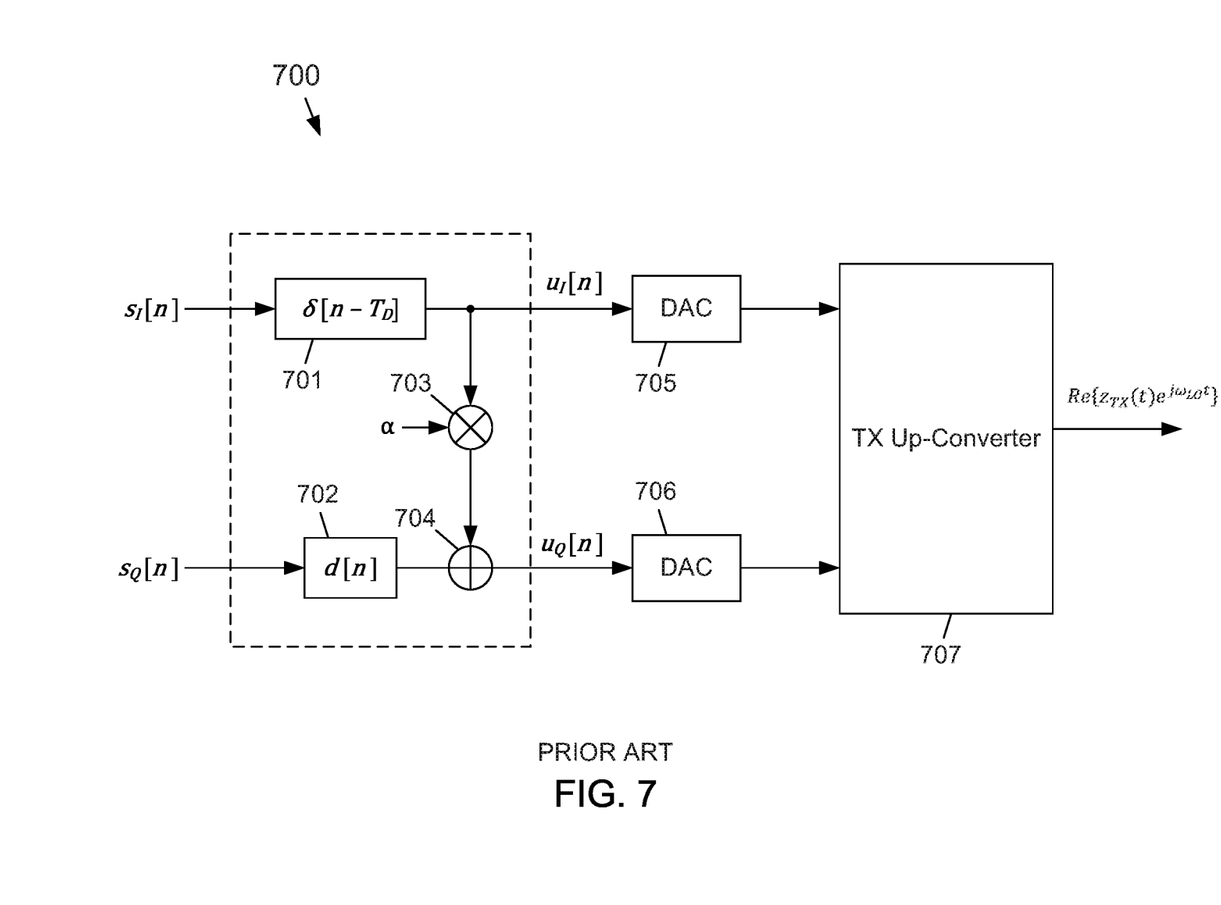
FIG. 7 shows an example embodiment of a traditional real-valued pre-compensator for a receive path that is shown being used in a transmit path.

A real-valued compensator (RVC) for an RX path may exist that may cancel RX-IQMM completely. One approach to find a RVC for a TX path may be to use the same RVC configuration that is used for a RX path in the TX path. FIG. 7 shows an example embodiment of a traditional RVC 700 for an RX path that is shown being used in a TX path. More specifically, the traditional RVC 700 may include the delay element 701, the real-valued filter d[n] 702, a multiplier 703, and a summer (or adder) 704. The delay element 701 may receive a digitized signal $s_I[n]$. The real-valued filter 702 may receive a digitized signal $s_Q[n]$. The pre-compensated output $u_I[n]$ of the delay element may be multiplied at the multiplier 703 by a cross-multiplication factor α, which is a real-valued scalar, and then summed at summer 704 with the output of the real-valued filter 702 to form a pre-compensated $u_Q[n]$. The $u_I[n]$ and $u_Q[n]$ outputs are respectively transformed to the analog domain by DACs 705 and 706. The analog-domain signals are input to a TX up-converter 707. The output of the TX up-converter 707 is subsequently amplified and/or transmitted.

For the traditional RVC 700, for a given delay $T_D$, it may be shown that the optimal a and D(f) that remove TX-IQMM are given by $$\alpha^{opt} = \frac{\sin\phi_{TX} H_{ITX}(f)}{g_{TX} H_{QTX}(f)}, \tag{10a}$$

$$D^{opt}(f) = \frac{\cos\phi_{TX} H_{ITX}(f)}{g_{TX} H_{QTX}(f)} e^{-j2\pi f T_D}, \tag{10b}$$

in which D(f) is frequency response of d[n]. It may be observed that the $\alpha^{opt}$ in Eq. (10a) that cancels IQMM completely is a function of frequency and, hence, should be a filter rather than a scalar. Thus, it may be concluded that the traditional RVC 700 shown in FIG. 7 may not cancel FD-IQMM at the TX side. The traditional RVC 700 may, however, cancel FI-IQMM as α=sin $\phi_{TX}/g_{TX}$ becomes a scalar in the case of FI-IQMM.

Figure 8:
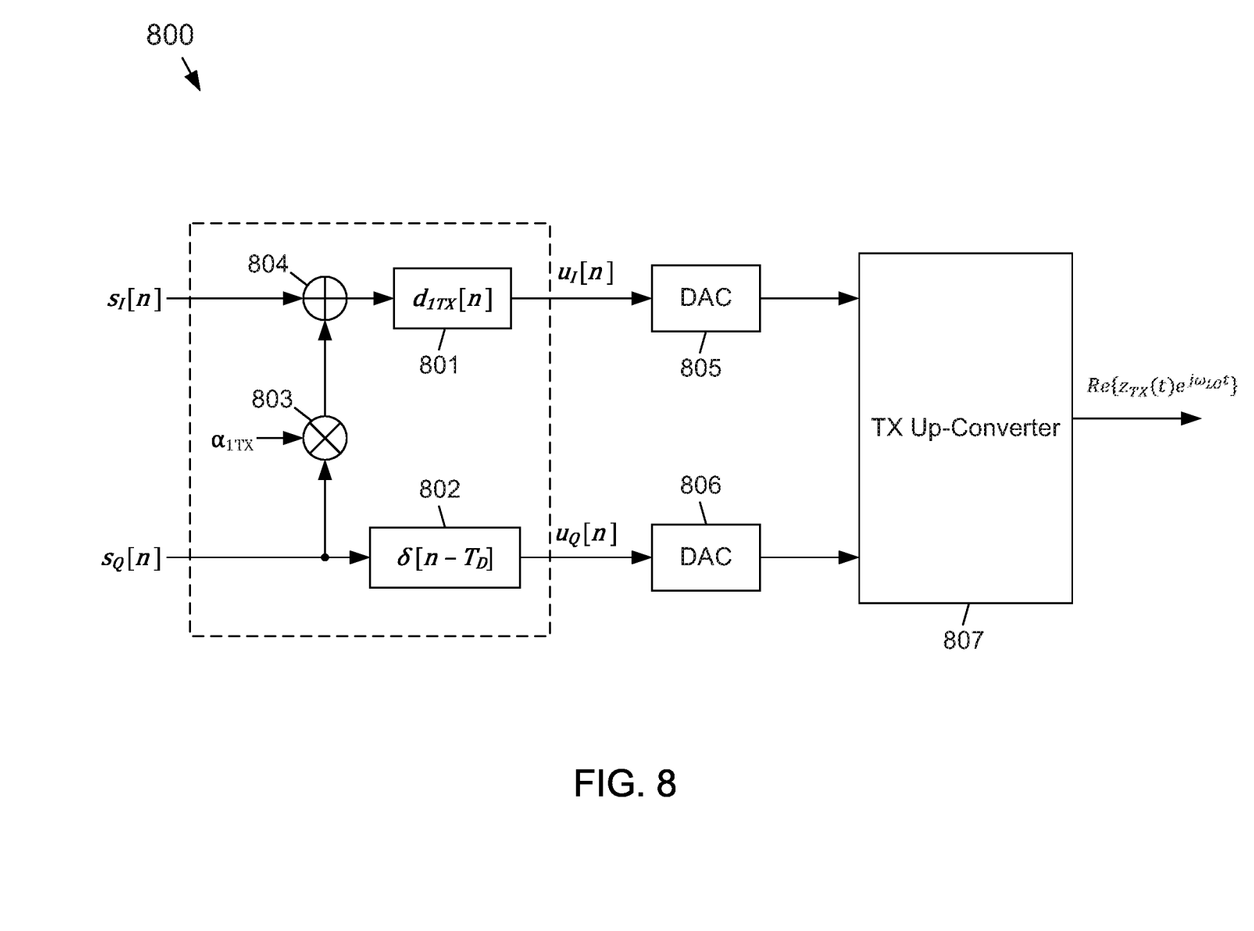
FIG. 8 shows a first example embodiment of a real-valued pre-compensator for a transmitter according to the subject matter disclosed herein.
Figure 9:
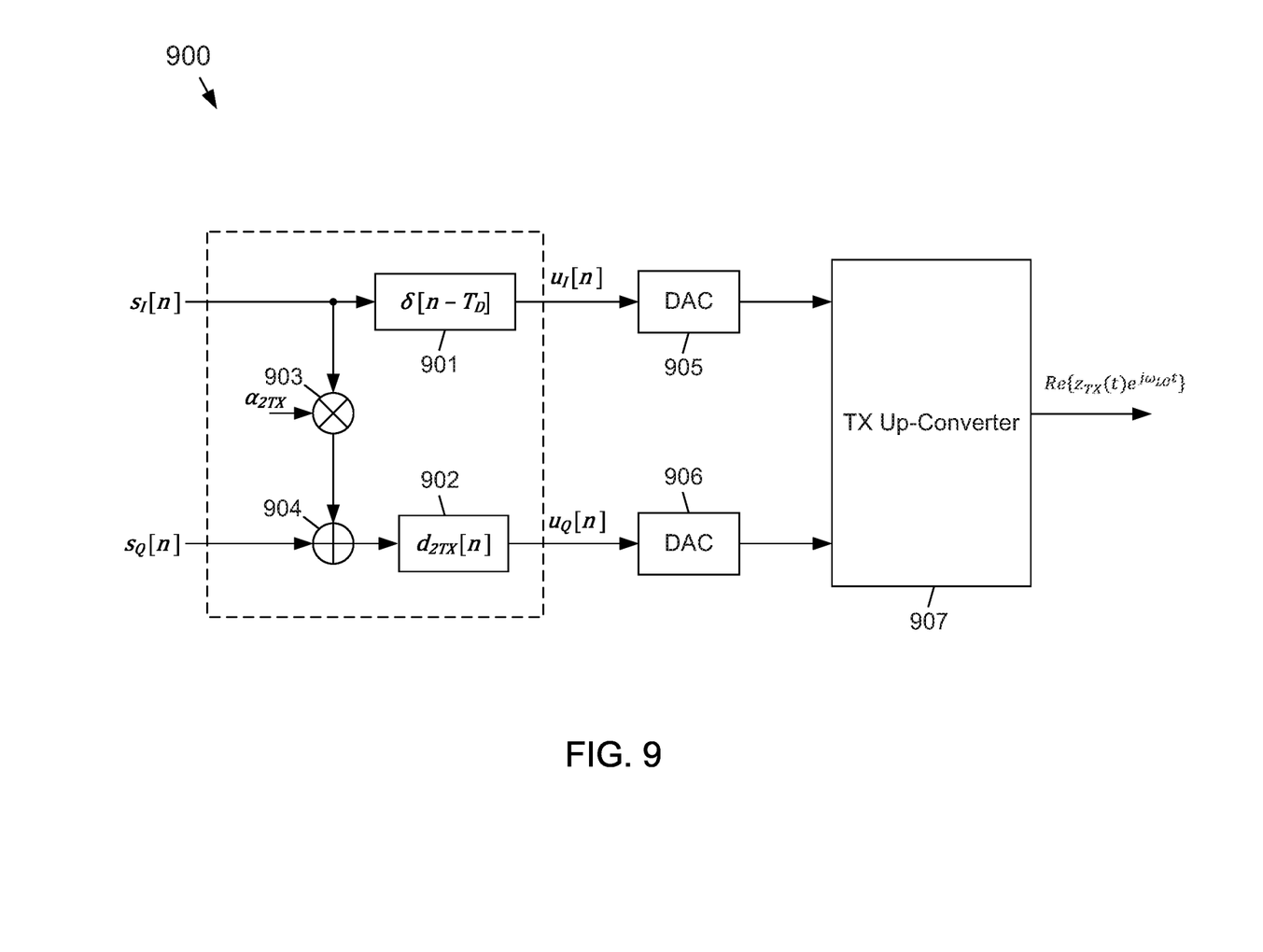
FIG. 9 shows a second example embodiment of a real-valued pre-compensator for a transmitter according to the subject matter disclosed herein.

FIGS. 8 and 9 respectively show first and second example embodiment of RVCs 800 and 900 for a transmitter according to the subject matter disclosed herein. A main difference between the TX RVCs 800 and 900, and the RX RVC 700 may be that the in-phase and quadrature signals may be combined before going through filtering in the TX RVCs 800 and 900, while the order is reversed in the traditional TX RVC 700.

The RVC 800 may include a real-valued filter $d_{1TX}[n]$ 801, a delay element 802 having a delay $T_D$, a multiplier 803, and a summer (or adder) 804. The delay element 802 may receive a digitized input signal $s_Q[n]$, and may output a pre-compensated signal $u_Q[n]$. The input signal $s_Q[n]$ may be multiplied by a real-valued cross-multiplication factor $\alpha_{1TX}$ at the multiplier 803, and then summed by the summer 804 with an input signal $s_I[n]$. The output of the summer 804 is input to the real-valued filter 801 to form a pre-compensated signal $u_I[n]$ as an output. The pre-compensated signal $u_I[n]$ and $u_Q[n]$ are respectively transformed to the analog domain by DACs 805 and 806. The analog-domain signals are input to a TX up-converter 807. The output of the TX up-converter 807 is subsequently amplified and/or transmitted.

The RVC 900 shown in FIG. 9 may be an alternative embodiment of the RVC 800 in FIG. 8, and may include a delay element 901 having a delay $T_D$, a real-valued filter $d_{2TX}[n]$ 902, a multiplier 903 and a summer 904. The delay element 902 may receive a digitized input signal $s_I[n]$, and may output a pre-compensated signal $u_I[n]$. The input signal $s_I[n]$ may be multiplied by a real-valued cross-multiplication factor $\alpha_{2TX}$ at the multiplier 903, and then summed by the summer (or adder) 904 with an input signal $s_Q[n]$. The output of the summer 904 is input to the real-valued filter 902 to form a pre-compensated signal $u_Q[n]$ as an output. The pre-compensated signals $u_I[n]$ and $u_Q[n]$ are respectively transformed to the analog domain by DACs 905 and 906. The analog-domain signals are input to a TX up-converter 907. The output of the TX up-converter 907 is subsequently amplified and/or transmitted.

For a given delay value $T_D$, the optimal RVC coefficients for the RVCs 800 and 900 that may remove the TX FD-IQMM may be given by $$\alpha_{1TX}^{opt} = \tan\phi_{TX}, \tag{11a}$$

$$D_{1TX}^{opt}(f) = g_{TX}\cos\phi_{TX} \frac{H_{QTX}(f)}{H_{ITX}(f)} e^{-j2\pi f T_D} = \frac{\cos\phi_{TX}}{V_{TX}(f)} e^{-j2\pi f T_D} \tag{11b}$$

and $$\alpha_{2TX}^{opt} = \tan\phi_{TX}, \tag{12a}$$

$$D_{2TX}^{opt}(f) = \cos\phi_{TX} \frac{H_{ITX}(f)}{g_{TX} H_{QTX}(f)} e^{-j2\pi f T_D} = \cos\phi_{TX} V_{TX}(f) e^{-j2\pi f T_D}. \tag{12b}$$

in which $D_{1TX}(f)$ and $D_{2TX}(f)$ respectively denote frequency responses of the real-valued filters 801 and 902. In the time-domain, the baseband equivalent of the up-converted signal for the RVC 800 may be given by $$z_{TX}[n] = g_{TX} \cos\phi_{TX} h_{QTX}[n] * s[n-T_D]. \tag{13}$$

Eq. (13) shows that TX IQMM may be canceled using RVC 800.

Similarly, in the time-domain, the baseband equivalent of the up-converted signal for the RVC 900 may be given by $$z_{TX}[n] = \cos\phi_{TX} e^{j\phi_{TX}} h_{ITX}[n] * s[n-T_D]. \tag{14}$$

Eq. (14) shows that TX IQMM may be canceled using RVC 900.

If there are estimates available for $G_{1TX}(f)$, $G_{2TX}(f)$ or $\phi_{TX}$ and $V_{TX}(f)$, the quadrature mismatch pre-compensator filters $w_{2TX}[n]$, $w_{3TX}[n]$, $d_{1TX}[n]$ and $d_{2TX}[n]$ may be designed having cross-multiplication factors $\alpha_{1TX}$ and $\alpha_{2TX}$ to provide the optimal responses given in Eqs. (6), (8), (11) and (12). With these IQMC responses, FD-IQMM at the TX chain may be completely cancelled. The optimal IQMC responses may, however, be unrealizable so that the optimal responses might use non-causal filter and/or infinite number of filter taps. Finite impulse response (FIR) filters may be utilized for $w_{2TX}[n]$, $w_{3TX}[n]$, $d_{1TX}[n]$ and $d_{2TX}[n]$ to approximate the optimal responses given in Eqs. (6), (8), (11) and (12). Cross-multiplication factors $\alpha_{1TX}$ and $\alpha_{2TX}$ and coefficients of FIR filters $w_{2TX}[n]$, $w_{3TX}[n]$, $d_{1TX}[n]$ and $d_{2TX}[n]$ may be obtained using $G_{1TX}(f)$, $G_{2TX}(f)$ or $\phi_{TX}$ and $V_{TX}(f)$, which may be assumed to be known and estimated a priori. To this end, different approaches may be utilized. One example approach may be to use a least squares (LS) technique that fits the response of FIR filter to the optimal frequency responses of IQMC filters at selected frequencies.

Figure 10:
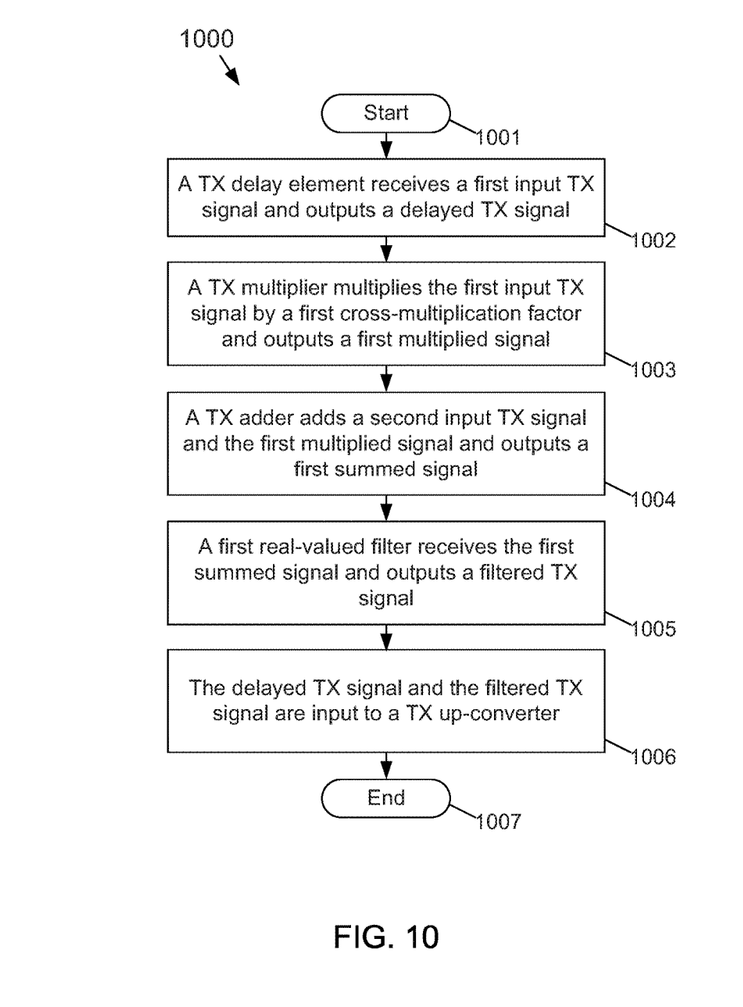
FIG. 10 shows a second example embodiment of a method for pre-compensating IQ mismatch in baseband for transmission in a quadrature transmitter according to the subject matter disclosed herein.

FIG. 10 shows a second example embodiment of a method 1000 for pre-compensating IQ mismatch in baseband for transmission in a quadrature transmitter according to the subject matter disclosed herein. Referring to FIGS. 8-10, the method 1000 starts at 1001 in FIG. 10. At 1002, a TX delay element 802, 901 receives a first input TX signal and outputs a delayed TX signal. At 1003, a TX multiplier 803, 903 multiplies the first input TX signal by a first cross-multiplication factor and outputs a first multiplied signal. At 1004, a TX adder 804, 904 adds a second input TX signal and the first multiplied signal and outputs a first summed signal. At 1005, a first real-valued filter 801, 902 receives the first summed signal and outputs a filtered TX signal. At 1006, the delayed TX signal and the filtered TX signal are input to a TX upconverter. The method ends at 1007, and may be continuously repeated as needed.

The RVCs 800 and 900, and the method 1000 may be embodied by one or more modules that may use any combination of software, firmware and/or hardware configured to provide the functionality described herein in connection with the RVCs 800 and 900, and the method 1000. For example, any software may be embodied as a software package, code and/or instruction set or instructions, and any hardware may include, for example, singly or in any combination, an assembly, hardwired circuitry, programmable circuitry, state machine circuitry, and/or firmware that stores instructions executed by programmable circuitry. The one or more modules may, collectively or individually, be embodied as circuitry that forms part of a larger system, for example, but not limited to, an integrated circuit (IC), system on-chip (SoC), an assembly, and so forth.

Table 1 shows a comparison of the number of multipliers and adders that are used for the traditional CVC embodiment and traditional RVC embodiments of FIGS. 2 and 7 compared to the number of multipliers and adders that are used for the CVC and RVC embodiments shown in FIGS. 3, 4, 8 and 9 using L-tap finite impulse response (FIR) filters.

TABLE 1

| Embodiment | # of real multipliers | # of real adders | Comments |
| --- | --- | --- | --- |
| FIG. 2 (Traditional) | 4L | 4L | Has computational complexity that is greater than embodiments of FIG. 3 and 8. |
| FIG. 3 | 2L | 2L | Has smaller computational complexity than embodiment of FIG. 2. |
| FIG. 4 | 2L | 2L | Has smaller computational complexity than embodiment of FIG. 2. |
| FIG. 7 (Traditional) | L + 1 | L | Cannot cancel TX FD-IQMM |
| FIG. 8 | L + 1 | L | Can cancel TX FD-IQMM |
| FIG. 9 | L + 1 | L | Can cancel TX FD-IQMM |

Figure 11:
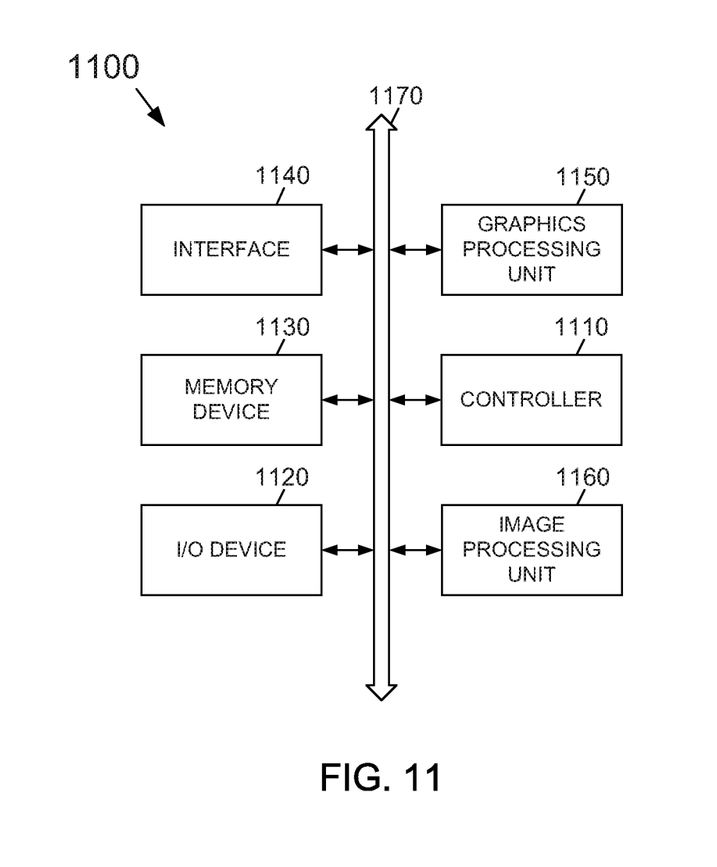
FIG. 11 depicts an electronic device that includes a quadrature transmitter that has a TX IQMC that may cancel FD-IQMM in the TX path according to the subject matter disclosed herein.

FIG. 11 depicts an electronic device 1100 that includes a quadrature transmitter that has a TX IQMC that may cancel FD-IQMM in the TX path according to the subject matter disclosed herein. Electronic device 1100 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 1100 may include a controller 1110, an input/output device 1120 such as, but not limited to, a keypad, a keyboard, a display, a touch-screen display, a camera, and/or an image sensor, a memory 1130, an interface 1140, a GPU 1150, and an imaging processing unit 1160 that are coupled to each other through a bus 1170. The controller 1110 may include, for example, at least one microprocessor, at least one digital signal processor, at least one microcontroller, or the like. The memory 1130 may be configured to store a command code to be used by the controller 1110 or a user data.

Electronic device 1100 and the various system components of electronic device 1100 may include the image processing unit 1160. The interface 1140 may be configured to include a wireless interface that is configured to transmit data to or receive data from a wireless communication network using a RF signal. The wireless interface 1140 may include, for example, an antenna, and a quadrature transmitter that has a TX IQMC that may cancel FD-IQMM in the TX path according to the subject matter disclosed herein. The electronic system 1100 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service—Time Division Duplex (UMTS-TDD), High Speed Packet Access (HSPA), Evolution Data Optimized (EVDO), Long Term Evolution—Advanced (LTE-Advanced), Multichannel Multipoint Distribution Service (MMDS), Fifth-Generation Wireless (5G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A transmit (TX) in-phase (I) and quadrature (Q) mismatch compensator (IQMC) (TX IQMC), comprising:
   a TX delay element configured to receive a first input TX signal and output a delayed TX signal;
   a TX multiplier configured to multiply the first input TX signal by a first cross-multiplication factor and to output a first multiplied signal;
   a TX adder configured to add a second input TX signal and the first multiplied signal and to output a first summed signal; and
   a first real-valued filter configured to receive the first summed signal and to output a filtered TX signal.

2. The TX IQMC of claim 1, wherein the first cross-multiplication factor comprises a real-valued scalar.

3. The TX IQMC of claim 1, wherein the first input TX signal comprises an I TX signal, and the second input TX signal comprises a Q TX signal.

4. The TX IQMC of claim 1, wherein the first input TX signal comprises a Q TX signal, and the second input TX signal comprises an I TX signal.

5. The TX IQMC of claim 1, further comprising an up-converter configured to receive the delayed TX signal and the filtered TX signal, and to output an up-converted TX signal.

6. The TX IQMC of claim 1, wherein the first real-valued filter includes at least one finite impulse response (FIR) filter.

7. The TX IQMC of claim 1, wherein the TX IQMC comprises part of a smartphone.

8. The TX IQMC of claim 1, wherein the TX IQMC comprises part of a laptop.

9. The TX IQMC of claim 1, wherein the TX IQMC comprises part of a wireless electronic device.

10. A method to compensate for an in-phase (I) and quadrature (Q) mismatch, the method comprising:
    receiving a first input transmit (TX) signal at a TX delay element;
    outputting, by the TX delay element, a delayed TX signal;
    multiplying, by a multiplier, the first input TX signal by a first cross-multiplication factor to output a first multiplied signal;
    adding, by an adder, a second input TX signal and the first multiplied signal and outputting a first summed signal;
    filtering the first summed signal, by a real-valued filter, to output a filtered TX signal; and
    inputting the delayed TX signal and the filtered TX signal into a TX up-converter.

11. The method of claim 10, wherein the first cross-multiplication factor comprises a real-valued scalar.

12. The method of claim 10, wherein the first input TX signal comprises an I TX signal, and the second input TX signal comprises a Q TX signal.

13. The method of claim 10, wherein the first input TX signal comprises a Q TX signal, and the second input TX signal comprises an I TX signal.

14. The method of claim 10, further comprising outputting from the TX up-converter an up-converted TX signal.

15. The method of claim 10, wherein the real-valued filter includes at least one finite impulse response (FIR) filter.

16. The method of claim 10, wherein the method is performed in a smartphone.

17. The method of claim 10, wherein the method is performed in a laptop.

18. The method of claim 10, wherein the method is performed in a wireless electronic device.

* * * * *